US009053526B2

(12) United States Patent
Kim et al.

(10) Patent No.: US 9,053,526 B2
(45) Date of Patent: Jun. 9, 2015

(54) METHOD AND APPARATUS FOR ENCODING CLOUD DISPLAY SCREEN BY USING APPLICATION PROGRAMMING INTERFACE INFORMATION

(71) Applicant: SAMSUNG ELECTRONICS CO., LTD., Suwon-si (KR)

(72) Inventors: Dae-hee Kim, Suwon-si (KR); Dai-woong Choi, Seoul (KR); Dae-sung Cho, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 30 days.

(21) Appl. No.: 14/045,333

(22) Filed: Oct. 3, 2013

(65) Prior Publication Data
US 2014/0099041 A1    Apr. 10, 2014

(30) Foreign Application Priority Data
Oct. 5, 2012    (KR) .......................... 10-2012-0110837

(51) Int. Cl.
  *G06K 9/36*    (2006.01)
  *G06T 9/00*    (2006.01)
(52) U.S. Cl.
  CPC ....................................... *G06T 9/00* (2013.01)

(58) Field of Classification Search
  USPC ......... 382/232, 233, 239, 173, 190, 189, 255; 375/240; 455/414.1, 450; 707/827; 709/226, 235, 243; 713/165, 167
  See application file for complete search history.

(56) References Cited

U.S. PATENT DOCUMENTS

| 8,768,313 | B2 * | 7/2014 | Rodriguez | ................. 455/414.1 |
| 8,805,110 | B2 * | 8/2014 | Rhoads et al. | ................. 382/255 |
| 8,885,702 | B2 * | 11/2014 | Yang et al. | ..................... 375/240 |
| 8,886,206 | B2 * | 11/2014 | Lord et al. | ..................... 455/450 |

* cited by examiner

*Primary Examiner* — Anh Do
(74) *Attorney, Agent, or Firm* — Sughrue Mion, PLLC

(57) ABSTRACT

A method and apparatus for implementing cloud computing by efficiently encoding a display screen between a cloud server and a client terminal. The method for encoding a cloud display screen in the cloud server, includes: acquiring region information of currently generated windows based on an application programming interface (API) function information of an Operating System (OS); extracting relative depth information between each of the currently generated windows from the OS; generating an encoding mode map in which an entire screen is divided into a plurality of blocks, based on the acquired region information and the extracted relative depth information; and encoding each of the plurality of blocks based on the generated encoding mode map.

20 Claims, 9 Drawing Sheets

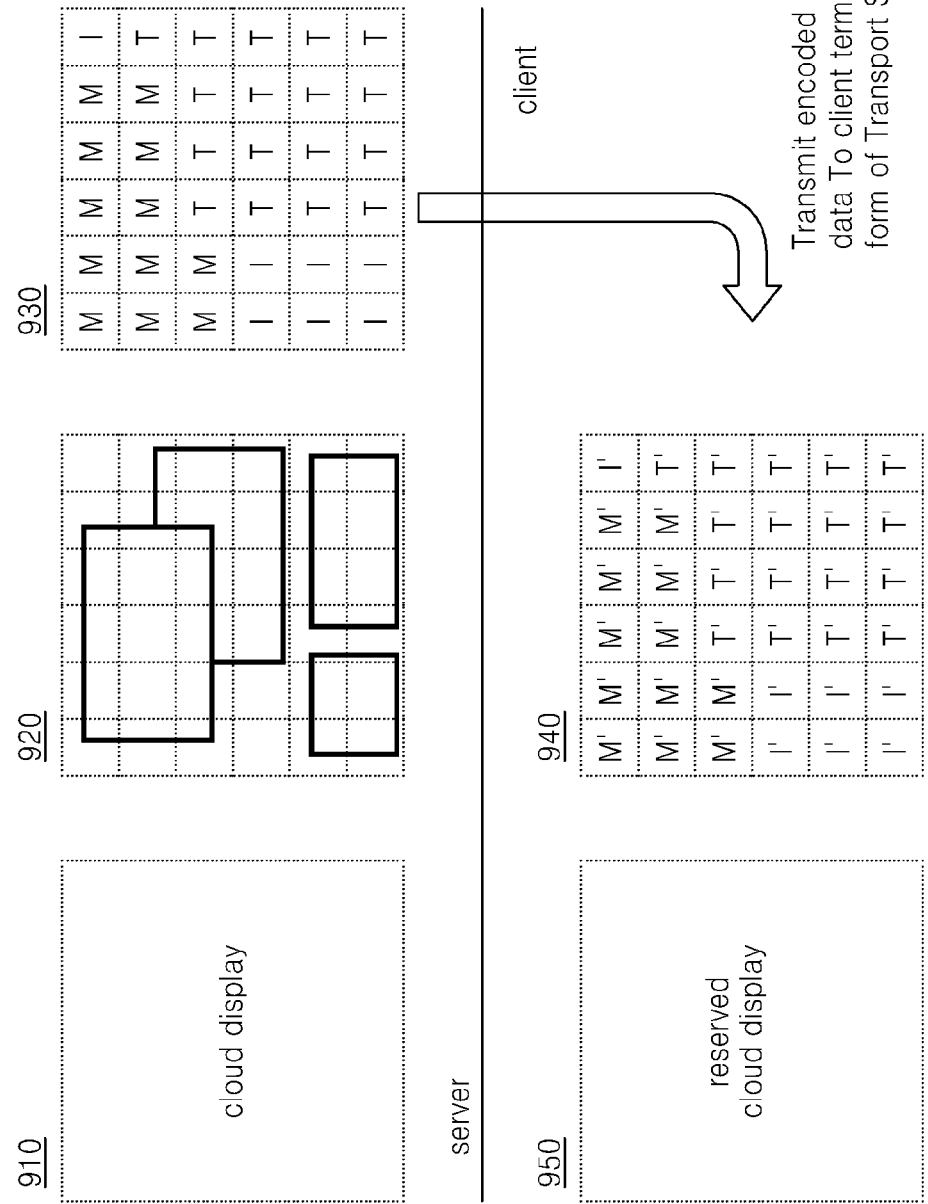

METHOD AND APPARATUS FOR ENCODING CLOUD DISPLAY SCREEN BY USING APPLICATION PROGRAMMING INTERFACE INFORMATION

CROSS-REFERENCE TO RELATED PATENT APPLICATION

This application claims the benefit of Korean Patent Application No. 10-2012-0110837, filed on Oct. 5, 2012, in the Korean Intellectual Property Office, the disclosure of which is incorporated herein in its entirety by reference.

BACKGROUND

1. Field

Exemplary embodiments relate to techniques of encoding a screen, and transmitting the encoded screen to a terminal in a server constituting a cloud system. More particularly, exemplary embodiments relate to techniques of analyzing a region of a window displayed on a screen by using application programming interface (API) information processed by a kernel or Operating System (OS), and also encoding the screen by using depth information of the window.

2. Description of the Related Art

Data encoding methods of the related art may be classified into lossy encoding methods, and lossless encoding methods. When a region, such as a text, an icon, etc., having a feature in which even a slight deterioration in image quality is conspicuous is compressed, lossless encoding methods are generally preferred. When a region, such as a photograph, a moving picture, etc., in which a pixel structure is complicated is compressed, lossy encoding methods are preferred because a data loss is not conspicuous, even though data may be lost.

However, when a compound image, including both a graphic element (a text, an icon, a figure, etc.) and an image element (a photograph, a moving picture, etc.), is encoded in the related art, the compound image is usually encoded using one algorithm. For example, a moving picture or photographic image encoding algorithm, such as H.264, MPEG-2, or JPEG, or a graphic element suitable encoding algorithm may be uniformly applied. In addition, when individual regions of a compound image are selectively encoded, the compound image may be analyzed, and encoding algorithms suitable for regions may be selectively applied according to the analysis result. In this case, an image analyzing process is mandatory. For image analysis, low-level image processing is representatively used. A low-level image processing technique of the related art analyzes a screen using statistical characteristic information of pixels and planarization or a gradient level of an image, which are obtained by using pixel values acquired by scanning a region to be encoded.

In a related art cloud system, a control signal input from a client terminal is processed by a server, and a processing result is displayed on a screen of the client terminal. In many cases, the client terminal does not have a separate Central Processing Unit (CPU) or a rendering tool. In this case, the server encodes an image to be displayed, and transmits the encoded image to the client terminal. However, a cloud display screen is usually provided with a compound image, including a text, a graphic, an image, a moving picture, etc.

If an encoding method of the related art is used for the cloud display screen, regardless of image characteristics, the encoding method may not be suitable. For example, it is assumed that a documentation work is performed using a cloud terminal. When an image analysis is applied to a cloud display screen on which the documentation work is being performed, text has a high probability to be analyzed as a text region, because the text has a large pixel value difference. However, if a related art image encoding algorithm is used, image quality may be significantly deteriorated, and readability of the text may decrease to a level at which it is difficult to perform the documentation work. Thus, it is very important to apply an encoding algorithm suitable for each region by using an image analysis. However, the low-level image processing technique of the related art always has a false alarm probability, and a missing alarm probability in region identification.

SUMMARY

Exemplary embodiments may provide methods and apparatuses for efficiently encoding a cloud display screen according to characteristics of region information constituting the cloud display screen and transmitting the encoded data to a cloud terminal in a cloud server, and decoding the encoded data and displaying the decoded data in the cloud terminal.

According to an aspect of the exemplary embodiments, there is provided a method for encoding a cloud display screen in a cloud server, including: acquiring region information of currently generated windows based on an application programming interface (API) function information of an Operating System (OS); extracting relative depth information between each of the currently generated windows from the OS; dividing an entire screen to a plurality of blocks, based on the acquired region information and the extracted relative depth information and generating an encoding mode map in which an encoding mode is allocated to each of the plurality of blocks; and encoding each of the plurality of blocks based on the generated encoding mode map.

The acquiring the region information may include designating an identifier to each of the currently generated windows and storing the region information of the currently generated windows corresponding to the identifiers. If at least one of the currently generated windows is finished, the region information corresponding to the identifier of the at least one finished window may be deleted. The identifier may be a window handle.

The generating the encoding mode map may include determining an encoding algorithm to be applied to each of the plurality of blocks, based on the acquired region information included in each of the blocks, or if a plurality of pieces of region information are included in each of the plurality of blocks, determining an encoding algorithm to be applied to each of the blocks based on a proportion of the plurality of pieces of region information constituting each of the blocks or determining an encoding algorithm to be applied to each of the blocks according to preset priorities of encoding algorithms corresponding to the plurality of pieces of region information included in each of the blocks.

The encoding each of the plurality of blocks may include encoding each of the plurality of blocks in an encoding method suitable for an encoding mode designated to each block according to a raster-scan order.

According to another aspect of the exemplary embodiments, there is provided a cloud server for encoding a cloud display screen, including: a region information acquisition device which acquires region information of currently generated windows based on an application programming interface (API) function information of an Operating System (OS); a depth information extractor which extracts relative depth information between each of the currently generated windows from the OS; a screen region determiner which generates an encoding mode map in which an entire screen is divided into a plurality of blocks based on the acquired region information and the extracted relative depth information; and an encoder which encodes each of the plurality of blocks based on the generated encoding mode map.

The region information acquisition device may designate an identifier to each of the currently generated windows and include a region storage unit which stores the region information of the currently generated windows corresponding to the identifiers. If at least one of the currently generated windows is finished, the region information corresponding to the identifier of the finished window may be deleted.

The screen region determiner may determine an encoding algorithm to be applied to each of the plurality of blocks based on the acquired region information included in each of the blocks or determine an encoding algorithm to be applied to each of the plurality of blocks based on depth information included in the block, or if a plurality of pieces of region information are included in each of the plurality of blocks, determine an encoding algorithm to be applied to each of the blocks based on a proportion of the plurality of pieces of region information constituting each of the blocks or determine an encoding algorithm to be applied to each of the blocks according to preset priorities of encoding algorithms corresponding to the plurality of pieces of region information included in each of the blocks.

According to another aspect of the exemplary embodiments, there is provided a cloud terminal for decoding a cloud display screen, including: a communication device which receives an encoded cloud display screen stream from a cloud server; and a decoder which decodes the encoded cloud display screen stream, wherein the encoded cloud display screen stream includes data encoded by an encoding algorithm, which is selectively applied to a plurality of block units divided from the encoded cloud display screen.

The decoder may decode the encoded cloud display screen stream using a decoding algorithm corresponding to the encoding algorithm.

According to another aspect of the exemplary embodiments, there is provided a method for encoding a cloud display screen in a cloud server, including: acquiring region information of a plurality of windows in units of identifiers based on an application programming interface (API) function information of an operating system (OS); acquiring relative depth information between the windows in the units of identifiers from the OS; determining characteristics of a plurality of screen regions based on the acquired relative depth information and the acquired region information; and encoding the cloud display screen based on the determined characteristics of the screen regions.

BRIEF DESCRIPTION OF THE DRAWINGS

The above and other features and advantages of the exemplary embodiments will become more apparent by describing in detail exemplary embodiments thereof with reference to the attached drawings in which:

FIG. 9 illustrates diagrams for describing a series of processes of encoding a cloud display screen, transmitting the encoded cloud display screen from a cloud server to a client terminal, and decoding the encoded cloud display screen, according to an embodiment.

DETAILED DESCRIPTION

As used herein, expressions such as "at least one of," when preceding a list of elements, modify the entire list of elements and do not modify the individual elements of the list.

Figure 1:
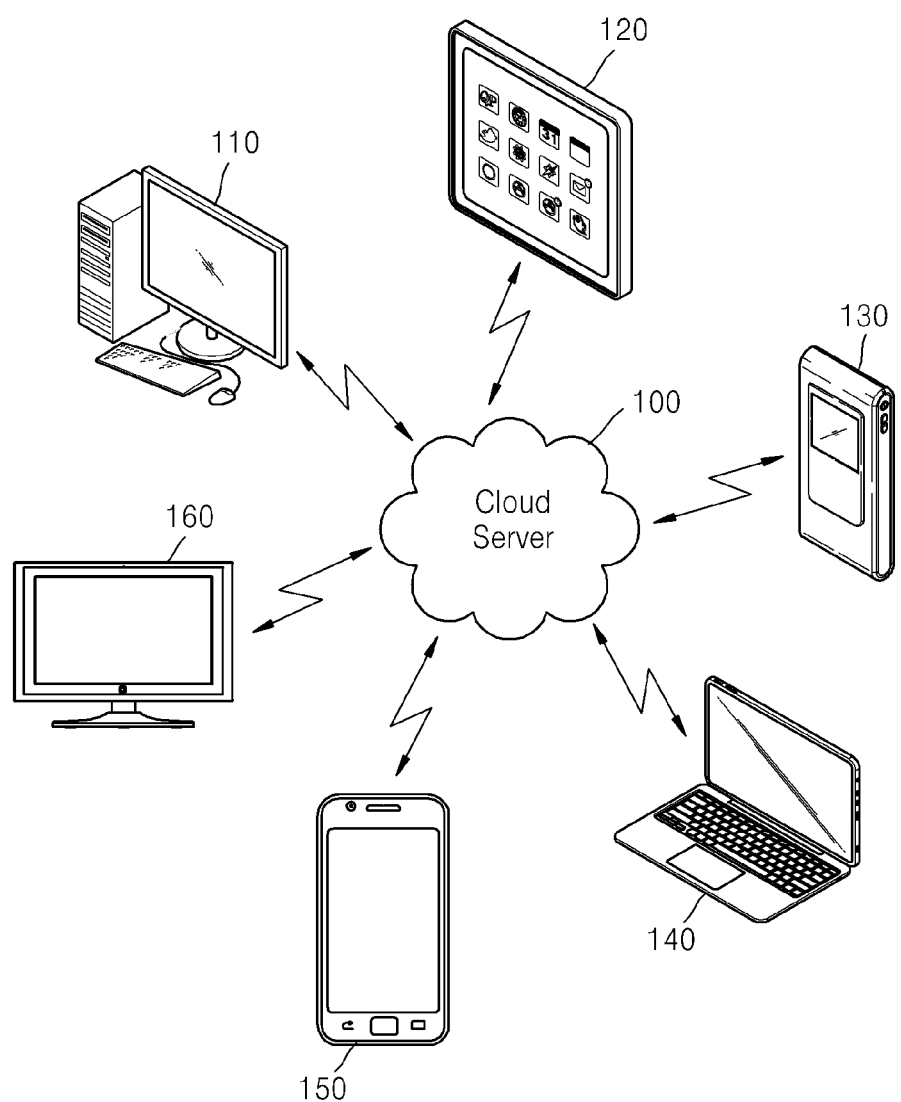
FIG. 1 is a schematic configuration of a general cloud system.

FIG. 1 is a schematic configuration of a cloud system. A Personal Computer (PC) 110, a tablet PC 120, a mobile phone 130, a laptop computer 140, a smart phone 150, a display device 160, etc., may constitute the cloud system, together with a cloud server 100. Although cloud, cloud computing, a cloud system, etc., may have a broad meaning, the cloud system described in the exemplary embodiments may be limited to the cloud system for performing functions of receiving a control signal, processing computation, and transmitting the processing result to a client terminal in a cloud server when the control signal is generated by the client terminal, and displaying the processing result in the client terminal.

Thus, the client terminal does not generally need a unit for performing separate computations. In other words, like a computer monitor, the client terminal may be formed by including only the least number of components required to display a computation result. Of course, the client terminal may include a user input interface and a communication unit, for generating and transmitting a control signal.

Several devices shown in FIG. 1, e.g., the smart phone 150 and the tablet PC 120, include an internal computation processing device, i.e., a processor. However, these devices may not consume system resources of the processor at all, or may rely on a cloud server for computation processing, while using the system resources of the processor for another use. Devices having a communication unit and a display processing capability may function as a client terminal, according to the exemplary embodiments.

Client terminals are classified into thin clients and zero clients. A classification criterion used depends on whether a client terminal includes computation processing capability, or a rendering tool. This classification or naming may be changed in the future, without limit according to the development of technology and a trend of the industry. A method suggested in the exemplary embodiments is particularly useful for zero client terminals not having a separate rendering tool. Of course, the method suggested in the exemplary embodiments may be applied to other types of client terminals, in terms of efficiency of system resources.

A user using the cloud system does not recognize that a client terminal has only a display device and an input device, and computations related to an input of the user are processed by the cloud server 100. In other words, the cloud system should process an input of the user such that the user does not recognize that the client terminal has only the display device and the input device, and computations related to the input of the user are processed by the cloud server 100. Therefore, the cloud system must satisfy a real-time requirement that a computation result according to the input of the user is displayed in real-time and must satisfy an image quality requirement that the user can easily recognize the displayed result.

However, when a cloud display screen is encoded to provide sufficient readability, a time consumed to perceive characteristics of the cloud display screen and encode the cloud display screen increases. In addition, a time taken to transmit such generated screen information to a client terminal and decode the received screen information in the client terminal also increases. Thus, the cloud system must satisfy the real-time requirement.

When the cloud display screen is encoded to satisfy the real-time requirement, resolution may be lowered too much, or readability may be lowered by applying an algorithm used for encoding an image or a moving picture to a region including a text. Thus, the image quality requirement may not be satisfied.

In other words, a method for encoding the cloud display screen is required to encode a screen to meet characteristics of regions constituting the cloud display screen, and satisfy the real-time processing result without image quality deterioration to a level which the user can detect. In particular, the method must be able to be applied to a case where a screen is restored, by using only a decoder corresponding to an encoder used in a server without a high-level rendering function.

Figure 2:
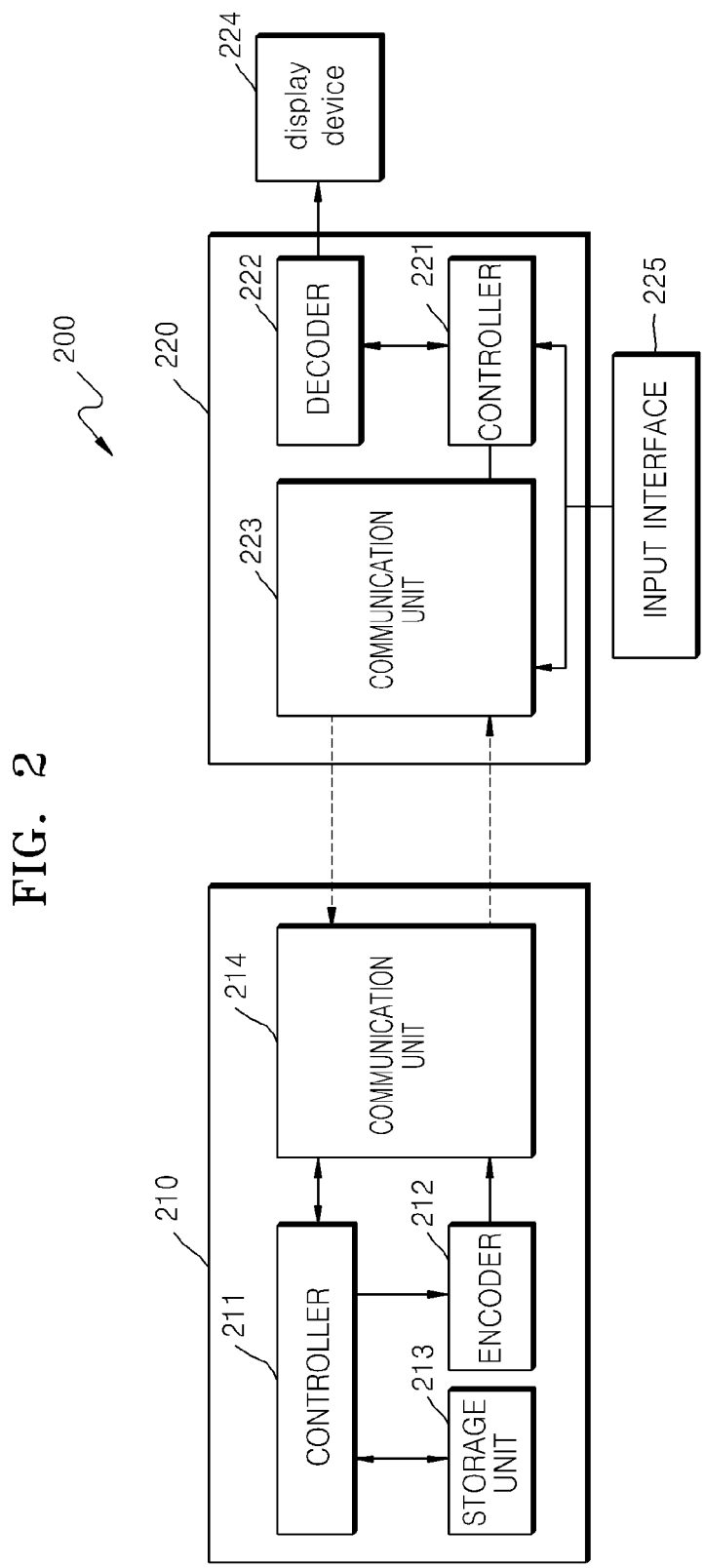
FIG. 2 is a block diagram of a cloud system including a cloud server and a client terminal, according to an embodiment.

FIG. 2 is a block diagram of a cloud system 200 including a cloud server 210 and a client terminal 220, according to an embodiment of the exemplary embodiments.

Although one cloud server 210 and one client terminal 220 are shown in FIG. 2, a plurality of terminals may be connected to the cloud server 210. In addition, if necessary, the cloud server 210 may process computations by being connected to another server, an external data storage device, etc.

The cloud server 210 includes a controller 211, an encoder 212, a storage unit 213, and a communication unit 214. The controller 211 controls components constituting the cloud server 210, and performs a function of processing a general work. In general, the controller 211 performs computations required according to a control signal received from the client terminal 220 via the communication unit 214. Although the communication unit 214 is shown as a single component, the communication unit 214 may include a receiver and a transmitter.

A computation result, processed by the controller 211, is encoded by the encoder 212 to be suitable for display by the client terminal 220. In the specification, a cloud display screen indicates a computation result before it is encoded. In other words, an image obtained by decoding an encoded cloud display screen is displayed by the client terminal 220. It will be understood that the cloud display screen is the computation result before it is encoded, which is displayed on a predetermined display device.

The client terminal 220 may include a controller 221, a decoder 222, a communication unit 223, an input interface 225, and a display device 224. Although it is shown in FIG. 2 that the input interface 225 and the display device 224 are externally connected to the client terminal 220, the input interface 225 and the display device 224 may be formed in one body together with the client terminal 220, e.g., a device such as a tablet PC.

The controller 221 of the client terminal 220 is different from the controller 211 of the cloud server 210. The controller 221 of the client terminal 220 does not have to include a processor for performing computations. In other words, the controller 221 of the client terminal 220 may perform only a function of controlling the decoder 222 to decode an encoded cloud display screen received via the communication unit 223 so that the decoded cloud display screen is displayed on the display device 224.

Figure 3:
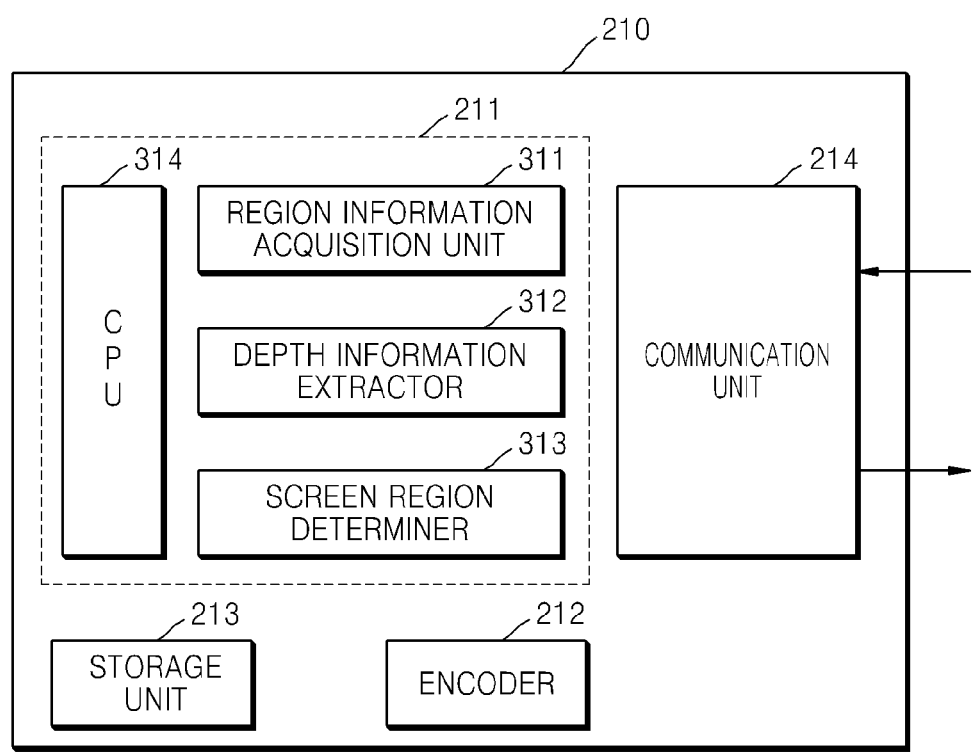
FIG. 3 is a detailed block diagram of the cloud server of FIG. 2.

FIG. 3 is a detailed block diagram of the cloud server 210 of FIG. 2. The controller 211 of the cloud server 210 may include a region information acquisition unit 311, a depth information extractor 312, a screen region determiner 313, and a Control Processing Unit (CPU) 314. A function of each component will be described in detail with reference to FIGS. 4 to 9. The components constituting the controller 211 may be integrated, or some of them may be omitted. The encoder 212 may also be included in the controller 211. A configuration, according to such a modification, may be freely achieved according to a knowledge level of one of ordinary skill in the art, and the configuration as shown in FIG. 3 is not necessarily required.

Figure 4:
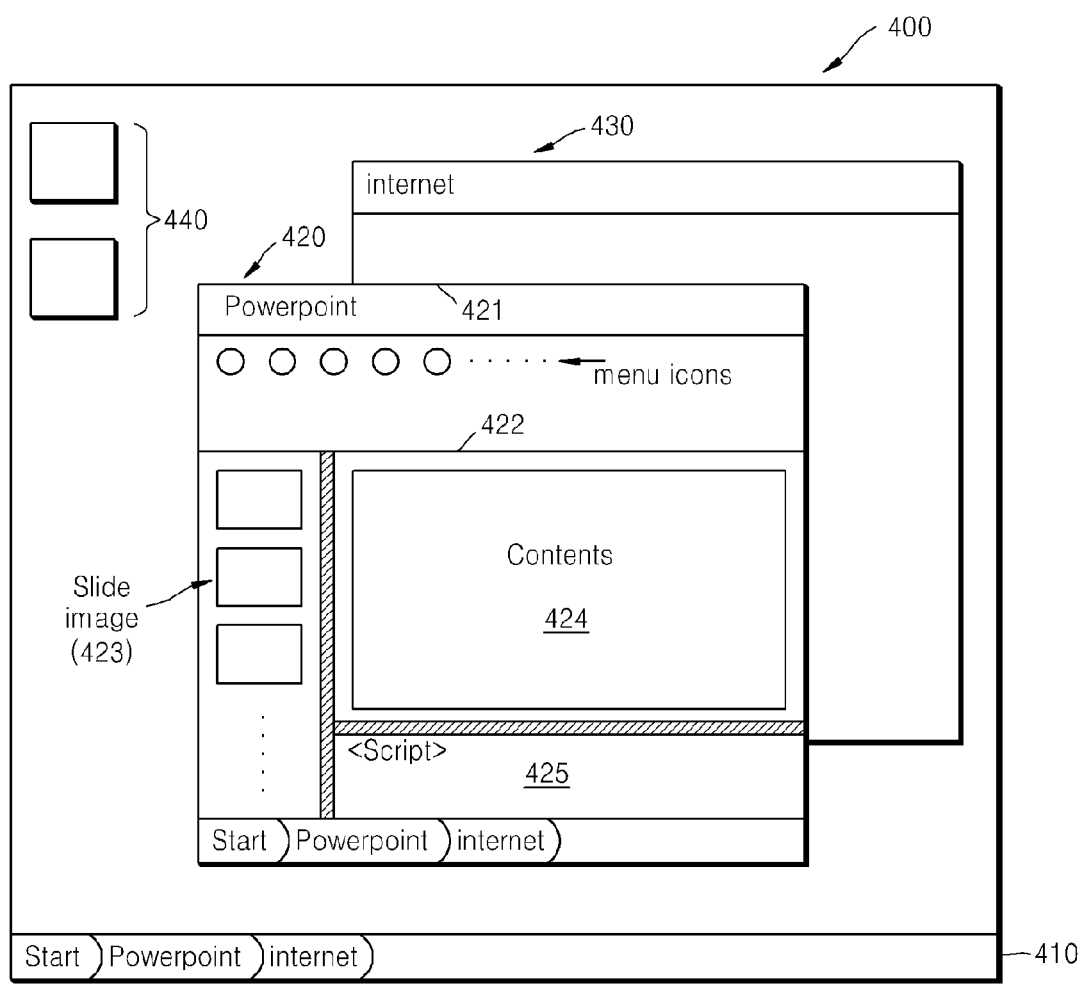
FIG. 4 illustrates a cloud display screen on which windows are displayed after operating an Operating System (OS), according to an embodiment.

FIG. 4 illustrates a cloud display screen 400 on which windows are displayed, after operating an Operating System (OS), according to an embodiment of the exemplary embodiments.

As a reference, the OS used in the exemplary embodiments may provide an application programming interface (API) required to operate an application program executed by a corresponding client terminal. In other words, examples of the OS may be the Windows series of Microsoft, Linux, Mac OS and iOS of Apple, Bada OS of Samsung, Android of Google, Symbian of Nokia, etc. In other words, the API indicates an interface for controlling functions provided by the OS, i.e., an interface for providing various functions, such as a file control function, a window control function, an image processing function, a character control function, and a communication function control function. The API includes various functions to produce various applications using functions provided by the OS.

Referring to FIG. 4, the cloud display screen 400 includes a task bar 410, a first window 420, a second window 430, and icons 440. It is assumed that the first window 420 is generated by a PowerPoint application program, and the second window 430 is generated by an Internet application program.

As described above, each application program outputs an output matter of the application program on a specific window, and windows are displayed on a screen by overlapping each other. In other words, a portion of the second window 430 is hidden by the first window 420 according to the overlapping. A portion of a basic background screen is also hidden by the first and second windows 420 and 430.

Each application program uses an API function to output a processing result on a window allocated. For example, the first window 420 includes a title display bar region 421, a menu icon region 422 including menu icons, a slide image region 423 for showing slide thumbnails on the left side of the first window 420, a contents region 424 for outputting main content of a corresponding slide on the right side of the first window 420, and a script region 425 for showing a script of the corresponding slide. If it is assumed that the OS is Windows, Windows uses an API function for outputting a text, such as DrawText, to output the text in the title display bar region 421 or the script region 425. In other words, by monitoring a text output function, such as DrawText, a location in the first window 420 to which the text is output can be perceived.

To output a bitmap, the OS may use an API function, such as BltBlt. By monitoring the API function, such as BltBlt, a location in the first window 420 to which the bitmap is output can be perceived. For example, information that the bitmap is output to a specific part of the contents region 424 of the first window 420 may be acquired.

To set a window for outputting video in a video play program, such as Media Player, a function, such as IvideoWindow::put_Owner( ) or IMFVideoDisplayControl::SetVideoWindow( ) is used. By monitoring the function, information regarding a window region in which the video is to be displayed may be obtained. Further, an application program uses a function, such as ImediaControl::Run( ) or IMFClockStateSink::OnClockStart( ) to play the video and uses a function, such as ImediaControl::Stop( ) or IMFClockStateSink::OnClockStop( ) to stop the play of the video. By monitoring these functions, information regarding a state of a video region may also be acquired. The state information may also be used to determine information regarding regions included in the window. In other words, for a region set to output video, if the present video is in a stop state instead of a play state, the region may be determined as an image region, instead of a video region.

Referring back to the first window 420, the title display bar region 421 and the script region 425 of the first window 420 may be determined as a text region, and the menu icon region 422 may be determined as an image region. In addition, the slide image region 423 may be compositively formed by a text region, a graphic region excluding a text, and an image region according to the contents output, and the contents region 424 may be compositively formed by a text region, a graphic region excluding a text, an image region, and a video region according to the contents output.

The above description related to the first window 420 is very simplified, when compared with a window generated by an actual application program. For example, when an API function is traced, only a portion of the left side of the title display bar region 421 may be determined as a text region. The menu icon region 422 may be determined as a text region in which a name of each menu is shown and an image region in which menu icons are shown. Likewise, the other parts forming the first window 420 may also be more concretely determined. In other words, information regarding regions forming a window acquired from API information related to the window generated by an actual application program, i.e. region information of the window, may include much more complicated and various regions than those shown in FIG. 4.

Furthermore, a text region, a graphic region excluding a text, an image region, and a video region are only illustrated for classifying regions. For example, for the slide image region 423, a portion in which images are actually shown is only rectangular regions, and a region excluding the rectangular regions is filled with a background graphic. This region may be separately classified into, for example, a graphic region. Likewise, a graphic, a picture image, an animation, and so forth may also be applied to a wallpaper region.

Referring to the second window 430, the second window 430 is generated by a web browser application. Various pieces of content may be included in the second window 430. When an API function related to the second window 430 is traced, region information of the second window 430 may be acquired, as performed in the first window 420. However, a portion of the second window 430 is hidden by the first window 420, and is not displayed. In other words, to finally determine window region information of a cloud display screen displayed on the client terminal 220, information regarding a relationship between windows overlapping each other is necessary. Information regarding the relationship between windows overlapping is depth information, and will be described below.

The region information acquisition unit 311 determines a characteristic of a corresponding region from API information generated from a window of each of the individual application programs, and extracts information regarding windows displayed on the whole screen and information regarding regions belonging to each of the windows, i.e., region information of each window, which are collected through the regional characteristic determining process. In other words, when an individual application program outputs a text in a specific region of a window using an API, the specific region is determined as a text region based on this information. When an individual application program outputs a photograph or picture in a specific region of a window by using an API, the specific region is determined as a picture region. When an individual application program plays video in a specific region of a window by using an API, the specific region is determined as a video region. According to this process, regions of all windows displayed on the whole screen are determined, and the entire window information, information regarding all regions belonging to each window, and relationship information indicating which region information belongs to which window are stored. In other words, information regarding regions forming each window is acquired by designating an identifier corresponding to the window, and collecting and storing region information corresponding to the identifier. A detailed description of the identifier will be made below.

Figure 5:
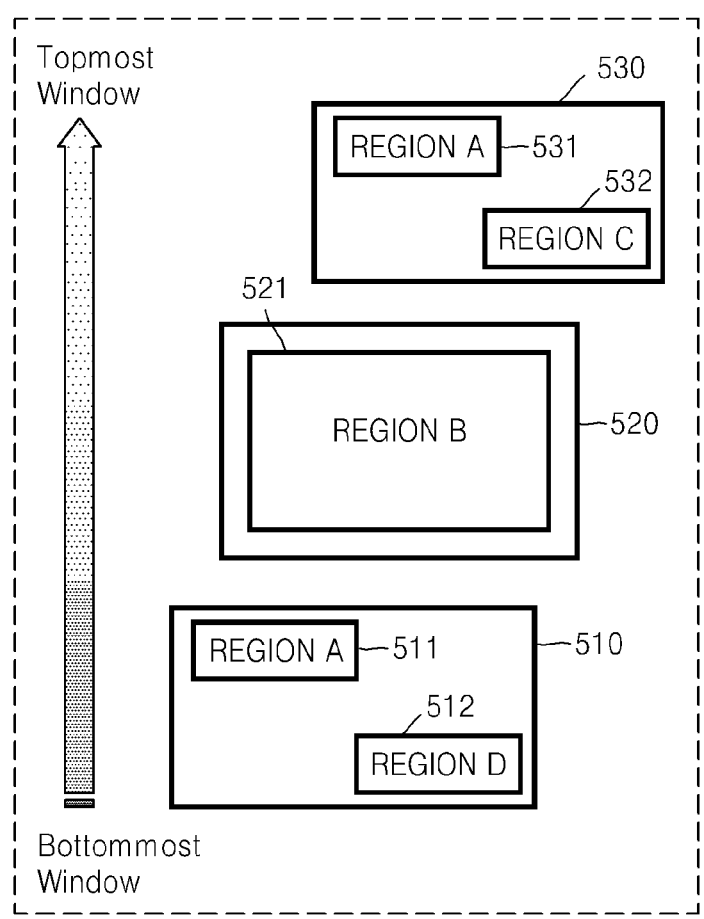
FIG. 5 illustrates relative depths between windows displayed on a screen.

FIG. 5 illustrates relative depths between windows displayed on a screen. It is assumed that three windows 510, 520, and 530 are displayed. In addition, it is assumed that a region having a text characteristic is a region A, a region having an image characteristic is a region B, a region having a video characteristic is a region C, and a region having a graphic characteristic is a region D. The bottommost window 510 includes a region A 511 and a region D 512. The middle-level window 520 includes a region B 521. The topmost window 530 includes a region A 531 and a region C 532.

The depth information extractor 312 extracts relative depth information between the windows 510, 520, and 530. For example, if one window is displayed on a screen, and a portion or all of another window is hidden by the window located at the front by overlapping, the two windows have different depths. The depths of the two windows are set by starting from a window displayed on the forefront of the screen. In other words, a window located at the rear is considered to be located at a relatively deeper place than the window displayed on the forefront of the screen. If two windows are displayed without overlapping each other, both the two windows have the same depth information, and are located at the forefront of a screen. The depth information extractor 312 extracts depth information between windows displayed on a screen from among application programs being currently executed by the OS. In this case, the depth information extractor 312 may also extract coordinate information of each window. If a plurality of windows are generated by a single application program, the plurality of windows are individually processed. Since the OS should have information regarding depths between windows to display the windows by overlapping each other, the depth information extractor 312 may acquire depth information by a method, such as transmitting a specific function or command to the OS and acquiring a predetermined return value.

Figure 6:
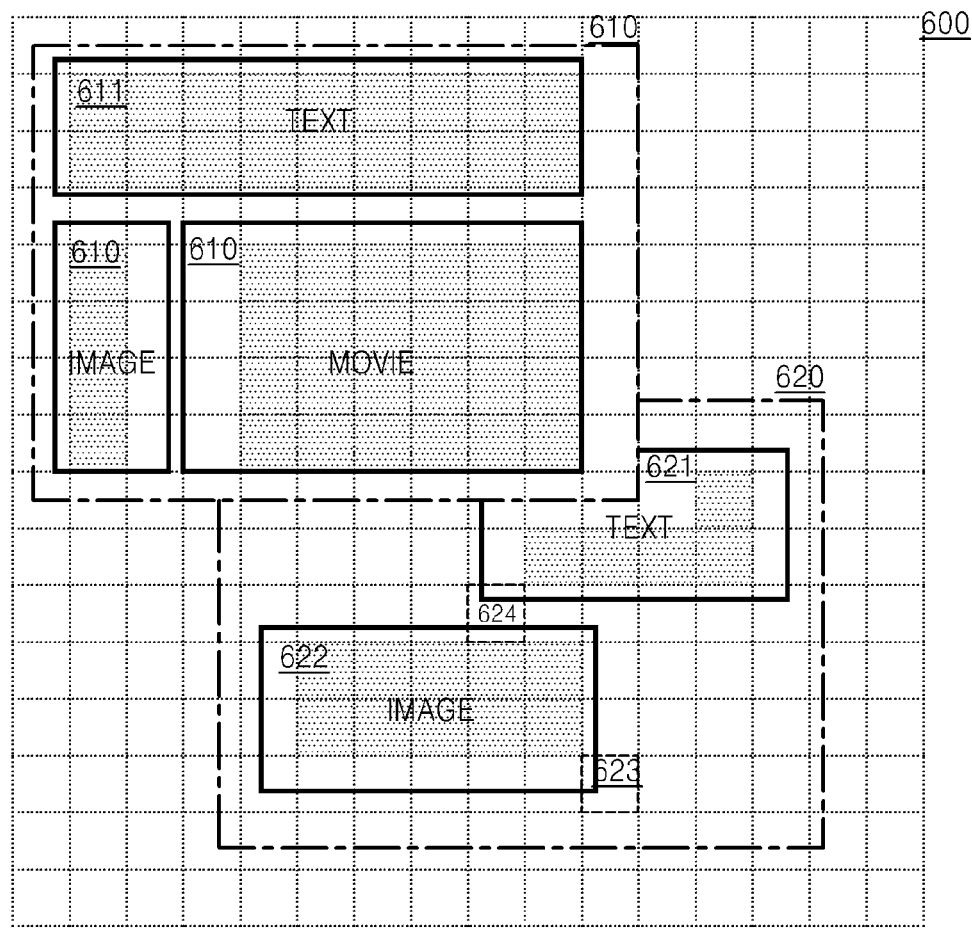
FIG. 6 is an image for describing a process of generating an encoding mode map based on region information and depth information, according to an embodiment.

FIG. 6 is an image for describing a process of generating an encoding mode map based on region information and depth information, according to an embodiment. It is assumed that two windows 610 and 620 are displayed. The region information acquisition unit 311 acquires information regarding regions belonging to each of the windows 610 and 620. The depth information extractor 312 determines which one of the windows 610 and 620 is located at the front by extracting relative depth information between the windows 610 and 620 from the OS. The window 610 located at the front includes a text region 611, an image region 612, and a video region 613. The window 620 located at the rear includes a text region 621 and an image region 622. It can be perceived that a portion of the text region 621 included in the window 620 located at the rear is not displayed, by referring to region information of the whole cloud display screen acquired by combining the region information and the depth information.

The whole cloud display screen is divided into a plurality of blocks. In FIG. 6, the whole cloud display screen is divided into 16×16, i.e. 256, blocks. The number of divisions and a division method may be freely changed according to a resolution of a display device or a system performance. For example, a screen may be divided into 128×128, i.e. 16384, blocks, or 12 (4×3) or 144 (16×9) blocks in consideration of a display device having a resolution of 16:9. Of course, the screen may be divided into an arbitrary number of blocks, regardless of the resolution. In addition, sizes of the blocks may be all the same or different from each other.

A shaded block among the divided blocks indicates a block filled with a region having one characteristic. For example, the text region 611 of the window 610 located at the front is distributed in a region corresponding to a portion or total of 44 (11×4) blocks. Only 18 shaded blocks of the 44 (11×4) blocks are fully filled with a text region. In the same manner, 4 blocks of the image region 612 of the front window 610 and 24 blocks of the video region 613 of the front window 610 are filled with only a video region. Similar to the shaded blocks, when one block is filled with a region having one characteristic, an encoding mode suitable for the characteristic of the region included in the block may be allocated to the block. For example, encoding modes, e.g., a text mode to a block fully filled with a text region, an image mode to a block fully filled with an image region, and a video mode to a block fully filled with a video region, may be allocated to the blocks. This description may be applied to blocks belonging to the window 620 located at the rear.

However, one block may be not fully filled with one regional characteristic or may include two or more regional characteristics. For example, a block 623 includes an image region in only a portion, and a block 624 includes a text region and an image region in a portion. A method for encoding such a divided block may be determined according to how much of the divided block includes regions having different characteristics. For example, an encoding mode may be determined based on which region is mostly included in a block. If a text region is mostly included in a specific block, it is determined that the specific block is encoded in the text mode. The encoder 212 may use a method including an encoding algorithm corresponding to the text mode, e.g., a variable length encoding algorithm, such as a run-length encoding algorithm or a Huffman coding algorithm. Of course, even for the text mode, encoding may be performed using a lossy algorithm, according to settings. As another example, an encoding mode may be allocated to a block based on a region requiring an encoding mode having the least loss ratio from among characteristics of regions included in the block. In other words, when a block includes text, image, and video regions, even though the video region is distributed with the highest ratio, it may be difficult to recognize a text by encoding the block in the video mode. In this case, the block may be encoded in the text mode. The examples described above are merely examples in which an encoding mode is allocated to a block, and the encoding modes described above may be allocated to individual blocks according to various criteria. For example, when a block includes a plurality of regions, an encoding mode, such as the image mode or a graphic mode may also be uniformly allocated to the block.

The screen region determiner 313 determines regional characteristics of the whole cloud display screen by using the depth information extracted by the depth information extractor 312 and the region information acquired by the region information acquisition unit 311, and generates an encoding mode map of block units so that the encoder 212 improves a compression efficiency by reflecting the regional characteristics. If regions having a specific window identifier are all displayed regions having regard to the depth information, the regions are determined according to a characteristic stored in region information of a corresponding window. However, if the whole specific window is hidden by another window, region information having an identifier of the specific window is ignored. If a portion of a region included in a specific window is hidden, region information corresponding to a partially displayed portion is determined as a characteristic of the region.

Figure 7:
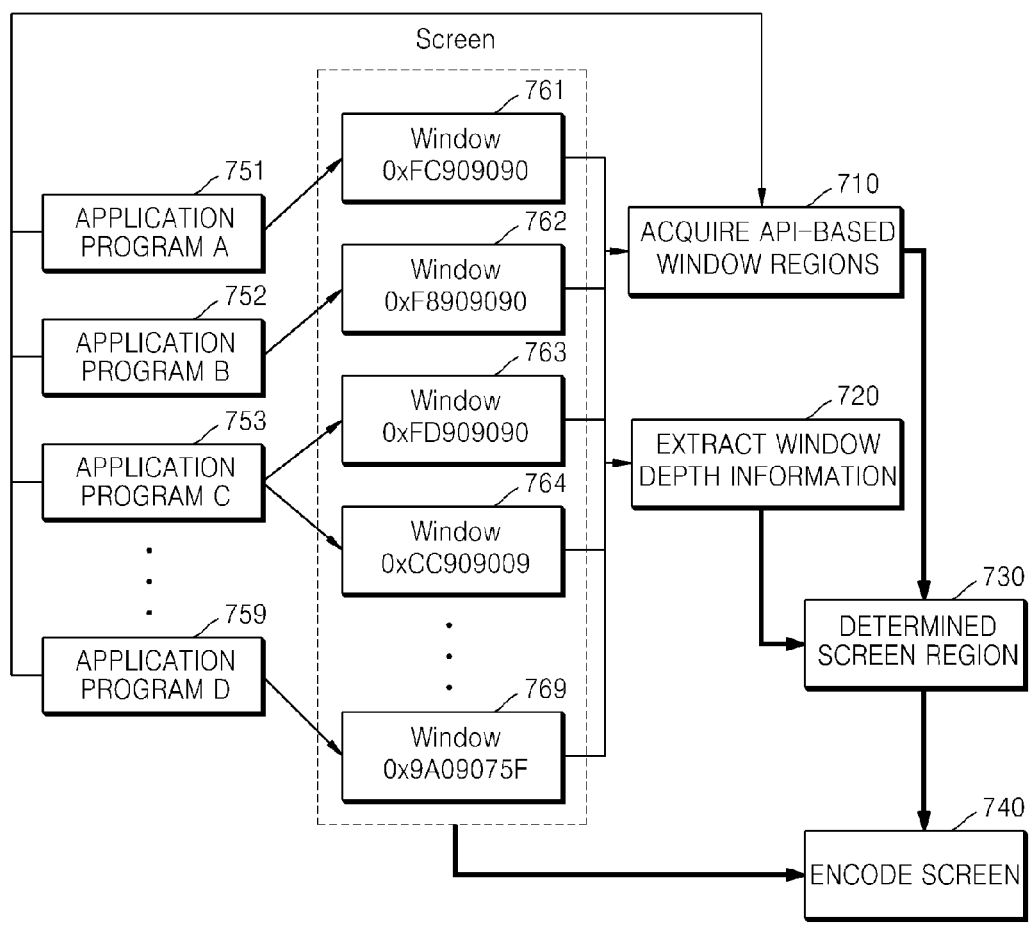
FIG. 7 is a signaling diagram of an encoding method having a characteristic of designating identifier information to each window, according to an embodiment.

FIG. 7 is a signaling diagram of an encoding method having a characteristic of designating identifier information to each window, according to an embodiment. A plurality of application programs, including an application program A 751 are being executed, and each application program generates a window using an API. An identifier may be designated to each window. For example, the application program A 751 may generate a window 761 having an identifier of 0xFC909090. One application program may generate a plurality of windows. An identifier is designated to each generated window. For example, an application program C 753 may generate a window 763 having an identifier of 0xFD909090 and a window 764 having an identifier of 0xCC909009. Information related to windows 761 to 769 is managed in units of identifiers. In operation 710, a cloud server acquires region information of the windows 761 to 769 in units of identifiers based on API information. In operation 720, relative depth information between the windows 761 to 769 is acquired from an OS in units of identifiers. In operation 730, characteristics (graphic, photograph, picture, text, video, etc.) of specific regions of a screen are determined from the acquired region information and the extracted depth information. For example, if a portion of the window 761 having the identifier of 0xFC909090 is hidden by a window 762 having an identifier of 0xF8909090, information regarding a region which is not hidden by using coordinate information of the window 762 having the identifier of 0xF8909090 from among the region information of the window 761 is determined as a characteristic of the region. In this case, if a portion of specific region information from among the region information having the identifier of 0xFC909090 is hidden, only region information corresponding to the unhidden portion is determined as a characteristic of a corresponding region. The coordinate information may be acquired from not only the region information acquisition unit 311 and the depth information extractor 312, but also components, such as the CPU 314, etc., of the controller 211.

After determining characteristics of all the screen regions, an encoding mode map for screen encoding is generated in operation 730. The encoding mode map is a map in which regional characteristics are redefined in a predefined block unit (e.g., 16×16). If one block includes a plurality of regional characteristics, an encoding mode is allocated to the block according to a predefined criterion. Other undetermined regions are encoded in a basic encoding mode predetermined by the encoder 212. For example, the predetermined basic encoding mode may be allocated to regions of which characteristics are not determined in correspondence with the API.

In operation 740, the encoder 212 encodes each block using an encoding algorithm corresponding to an encoding mode allocated to the block.

In other words, in operation 740, the encoder 212 encodes each block using an encoding algorithm predefined according to an encoding mode allocated to the block in a raster-scan order by using the encoding mode map generated by the screen region determiner 313. In other words, all the screen regions are encoded using an encoding algorithm suitable for a text when the text mode is allocated, an encoding algorithm suitable for a photograph region when a photograph mode is allocated, an encoding algorithm suitable for a graphic when the graphic mode is allocated, and an encoding algorithm suitable for a video when the video mode is allocated.

Figure 8:
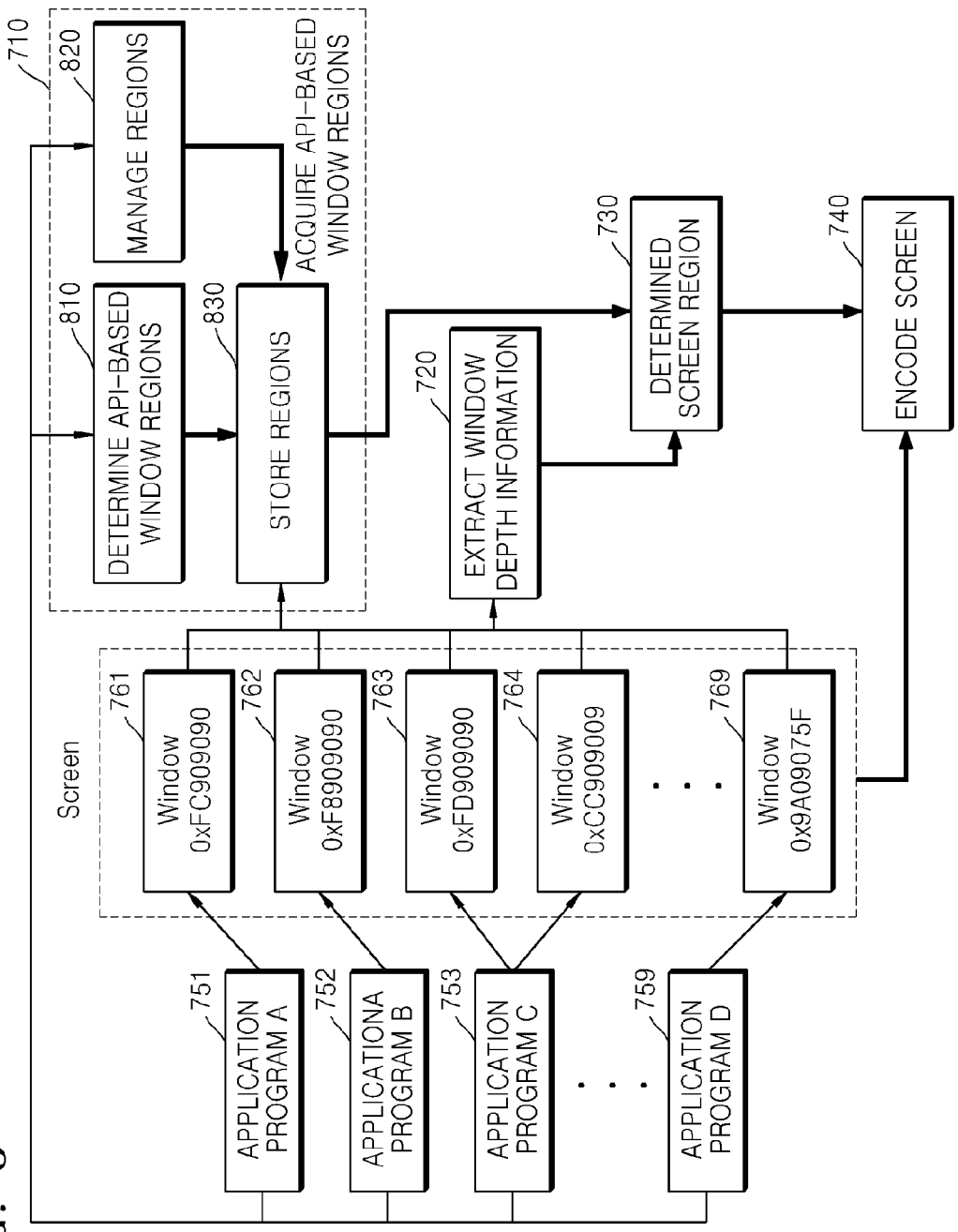
FIG. 8 is a signaling diagram showing in more detail operation of acquiring region information of API-based windows, according to an embodiment.

FIG. 8 is a signaling diagram showing the operation of acquiring region information of API-based windows in more detail, according to an embodiment. A part described in FIG. 7 is not repeated. The window region information acquisition operation (operation 710) of FIG. 7 may be segmented into operation 810 in which the contents of regions included in each window are determined based on the API, operation 820 in which the regions are managed, and operation 830 in which the region information is stored. To perform each operation, the region information acquisition unit 311 may further include a region management unit, a region storage unit, etc. Of course, these functions may be performed by components, such as the CPU 314, of the controller 211, the storage unit 213, etc.

The controller 211 may designate a corresponding identifier corresponding to a window to which region information of each individual application program belongs to the region information collected from the individual application program, and collect and store region information corresponding to the corresponding identifier. In other words, region information corresponding to a specific identifier is collected and stored as one group. Each group is identified by a window identifier. For example, if a work window of an application program, such as a word processor, includes a picture region A and a text region B, and an identifier of 0xFC909090 is designated to the work window, the window having the identifier of 0xFC909090 includes the picture region A and the text region B. In a system, coordinates and characteristic information of corresponding regions are stored, and the contents indicating information included in the identifier of 0xFC909090 are recorded. If the OS is Windows by Microsoft, a window handle designated by the system may be an identifier. A specific application program may have a plurality of windows, and the number of windows may vary according to circumstances. When a plurality of windows exist, a unique identifier is allocated to each window. Region information is classified based on an identifier of a window to which the region information belongs.

The region management unit manages region information stored in the system when an individual application program ends or newly starts. In other words when an application program newly starts, an identifier of a newly generated window is set, and a memory space for storing region information generated by the application program is secured. On the contrary, if an application program or window being executed is finished, region information stored based on an identifier corresponding to the finished window is deleted, and a corresponding memory space is returned to the system.

FIG. 9 illustrates diagrams for describing a series of processes of encoding a cloud display screen 910, transmitting the encoded cloud display screen from a cloud server to a client terminal, and decoding the encoded cloud display screen, according to an embodiment. The cloud server determines regional characteristics 920 of the whole screen based on region information and depth information according to the above-described method by analyzing the cloud display screen 910, and generates an encoding mode map 930 according to regional characteristics included in each block. In FIG. 9, M denotes a video encoding mode, I denotes an image encoding mode, and T denotes a text encoding mode. As described below, M', I', and T' denote corresponding decoding modes.

Although the encoding mode map 930 including 36 (6×6) blocks is shown in FIG. 9, the number of blocks and types of regions may be changed. In addition, even for the same image regions, encoding modes, such as I1, I2, and I3, may be set for the image regions by segmenting the image regions to apply different compression algorithms having different loss ratios.

Once the cloud display screen 910 is encoded based on the encoding mode map 930, the encoded cloud display screen is transmitted to the client terminal in the form of a Transport Stream (TS). In this case, in the TS, information regarding encoding modes of corresponding data may be included in a header and others forming the TS. The client terminal analyzes the received TS, and displays a restored cloud display screen 950 by applying decoding algorithms 940 corresponding to the encoding modes to corresponding blocks. In this case, the decoding may be performed in an order from a block on the left topmost corner to a block on the right bottommost corner, as in a raster-scan order. By applying this ordering method, the client terminal may restore a cloud display screen thereon by sequentially restoring all regions from a region corresponding to the block on the left topmost corner even without a separate rendering tool.

According to the exemplary embodiments, a cloud system classifies characteristics of regions in a screen at a high speed, and encodes the screen according to the characteristics without performing a complex calculation of low-level image processing. Accordingly, a delay time and a compression efficiency are improved in communication between a server and a client, to thereby provide a smooth cloud computing service supporting a graphic user interface (GUI).

In addition, a client terminal may efficiently restore a cloud display screen based on API information, without including any separate rendering tool.

The block diagrams disclosed in the exemplary embodiments may be analyzed by one of ordinary skill in the art such that a circuit for implementing the principles of the exemplary embodiments is conceptually expressed. Similarly, it may be understood by one of ordinary skill in the art that arbitrary flowcharts, flow diagrams, state transition diagrams, and pseudo codes are substantially represented in a computer-readable recording medium and indicate various processes that can be executed in a computer or processor, regardless of whether the computer or processor is explicitly shown. Thus, the embodiments can be written as computer programs, and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

Functions of various elements shown in the drawings may be provided by using not only software-executable hardware in association with proper software, but also exclusively hardware. When the functions are provided by a processor, the functions may be provided by a single exclusive processor, a single shared processor, or a plurality of individual processors, some of which can be shared. In addition, the explicit use of the term "processor" or "controller" should not be analyzed as exclusively indicating software-executable hardware, and may implicitly include Digital Signal Processor (DSP) hardware, a Read Only Memory (ROM) for storing software, a Random Access Memory (RAM), and a non-volatile storage device without any limitation.

In the claims of the specification, an element expressed as a means for performing a specific function includes an arbitrary method for performing the specific function, and this element may include an arbitrary format of software including firmware, microcode, etc., which are combined with a set of circuit elements for performing the specific function or a circuit suitable to perform software for performing the specific function.

In the specification, 'an embodiment' of the principles of the exemplary embodiments and various modifications of this expression indicate that a specific feature, structure, and characteristic related to the embodiment are included in at least one embodiment of the principles of the exemplary embodiments. Thus, the expression 'in an embodiment' and arbitrary other modifications disclosed in the entire specification do not necessarily indicate the same embodiment.

In the specification, in a case of 'at least one of A and B', the expression 'at least one of' is used to include the selection of the first option A, the selection of the second option B, or the selection of the both options A and B. In addition, a case of 'at least one of A, B, and C' may include the selection of the first option A, the selection of the second option B, the selection of the third option C, the selection of the first and second options A and B, the selection of the second and third options B and C, or the selection of the three options A, B, and C. Even when more options are listed, this may be clearly extended and analyzed by one of ordinary skill in the art.

Exemplary embodiments have been particularly shown, and described with reference to exemplary embodiments. All the embodiments and conditional examples disclosed throughout the specification are described to help one of ordinary skill in the art understand the principle and concept of the exemplary embodiments, and it will be understood by one of ordinary skill in the art that various changes in form and details may be made therein without departing from the spirit and scope of the exemplary embodiments as defined by the following claims. The exemplary embodiments should be considered in descriptive sense only, and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A method for encoding a cloud display screen in a cloud server, comprising:
   acquiring region information of currently generated windows based on an application programming interface (API) function information of an Operating System (OS);
   extracting relative depth information between each of the currently generated windows from the OS;
   generating an encoding mode map in which an entire screen is divided into a plurality of blocks, based on the acquired region information and the extracted relative depth information; and
   encoding each of the plurality of blocks based on the generated encoding mode map.

2. The method of claim 1, wherein the acquiring the region information comprises designating an identifier to each of the currently generated windows, and storing the region information of the currently generated windows corresponding to the identifiers.

3. The method of claim 2, wherein the acquiring the region information comprises, when at least one of the currently generated windows is finished, deleting the region information corresponding to the identifier of the at least one finished currently generated window.

4. The method of claim 2, wherein the identifier is a window handle.

5. The method of claim 1, wherein the generating the encoding mode map comprises determining an encoding algorithm to be applied to each of the plurality of blocks, based on the acquired region information included in each of the blocks.

6. The method of claim 5, wherein the generating the encoding mode map comprises, if a plurality of pieces of region information are included in each of the plurality of blocks, determining an encoding algorithm to be applied to each of the blocks based on a proportion of the plurality of pieces of region information constituting each of the blocks.

7. The method of claim 5, wherein the generating the encoding mode map comprises, if a plurality of pieces of region information are included in each of the plurality of blocks, determining an encoding algorithm to be applied to each of the blocks according to preset priorities of encoding algorithms corresponding to the plurality of pieces of region information included in each of the blocks.

8. The method of claim 1, wherein the encoding each of the plurality of blocks comprises encoding each of the plurality of blocks in a raster-scan order.

9. A cloud server for encoding a cloud display screen, comprising:
   a region information acquisition device which acquires region information of currently generated windows based on an application programming interface (API) function information of an Operating System (OS);
   a depth information extractor which extracts relative depth information between each of the currently generated windows from the OS;
   a screen region determiner which generates an encoding mode map in which an entire screen is divided into a plurality of blocks, based on the acquired region information and the extracted relative depth information; and
   an encoder which encodes each of the plurality of blocks based on the generated encoding mode map.

10. The cloud server of claim 9, wherein the region information acquisition device designates an identifier to each of the currently generated windows, and comprises a region storage device which stores the region information of the currently generated windows corresponding to the identifiers.

11. The cloud server of claim 10, wherein the region information acquisition device further comprises a region management device which deletes the region information corresponding to the identifier of at least one of the currently generated windows if the at least one of the currently generated windows is finished.

12. The cloud server of claim 9, wherein the screen region determiner determines an encoding algorithm to be applied to each of the plurality of blocks, based on the acquired region information included in each of the blocks.

13. The cloud server of claim 12, wherein, if a plurality of pieces of region information are included in each of the plurality of blocks, the screen region determiner determines an encoding algorithm to be applied to each of the blocks based on a proportion of the plurality of pieces of region information constituting each of the blocks.

14. The cloud server of claim 12, wherein, if a plurality of pieces of region information are included in each of the plurality of blocks, the screen region determiner determines an encoding algorithm to be applied to each of the blocks according to preset priorities of encoding algorithms corresponding to the plurality of pieces of region information included in each of the blocks.

15. A cloud terminal for decoding a cloud display screen, comprising:
 a communication device which receives an encoded cloud display screen stream from a cloud server; and
 a decoder which decodes the encoded cloud display screen stream,
 wherein the encoded cloud display screen stream includes data encoded by an encoding algorithm, which is selectively applied to a plurality of block units divided from the encoded cloud display screen.

16. The cloud terminal of claim 15, wherein the decoder decodes the encoded cloud display screen stream using a decoding algorithm corresponding to the encoding algorithm.

17. A method for encoding a cloud display screen in a cloud server, comprising:
 acquiring region information of a plurality of windows in units of identifiers based on an application programming interface (API) function information of an operating system (OS);
 acquiring relative depth information between the windows in the units of identifiers from the OS;
 determining characteristics of a plurality of screen regions based on the acquired relative depth information and the acquired region information; and
 encoding the cloud display screen based on the determined characteristics of the screen regions.

18. The method of claim 17, further comprising:
 generating an encoding map in which the cloud display screen is redefined into a plurality of blocks based on the determined characteristics of the screen regions.

19. The method of claim 17, wherein the determined characteristics of the screen regions are determined based on identifiers in which the windows are not hidden.

20. The method of claim 18, wherein the plurality of blocks are encoded using an encoding algorithm corresponding to an encoding mode allocated to each block of the plurality of blocks.

* * * * *